(12) United States Patent
Feigin

(10) Patent No.: US 9,073,347 B2
(45) Date of Patent: Jul. 7, 2015

(54) HAND-HELD RADAR DEVICE WITH DIRECT PRINTING BASED ON RADAR INPUT

(71) Applicant: Geophysical Survey Systems, Inc., Salem, NH (US)

(72) Inventor: Jeffrey R Feigin, Andover, MA (US)

(73) Assignee: GEOPHYSICAL SURVEY SYSTEMS, INC., Salem, NH (US)

( * ) Notice: Subject to any disclaimer, the term of this patent is extended or adjusted under 35 U.S.C. 154(b) by 383 days.

(21) Appl. No.: 13/649,157

(22) Filed: Oct. 11, 2012

(65) Prior Publication Data

US 2014/0104094 A1    Apr. 17, 2014

(51) Int. Cl.
*G01S 13/88*    (2006.01)
*B41J 3/36*    (2006.01)
*B41J 3/407*    (2006.01)

(52) U.S. Cl.
CPC ............... *B41J 3/36* (2013.01); *G01S 13/885* (2013.01); *B41J 3/407* (2013.01)

(58) Field of Classification Search
CPC ..... G01S 13/885; G01S 13/89; G01S 13/887; G01S 13/888; G01S 13/04; G01S 13/56; G01S 13/88; G01S 7/046; G01V 3/12; G01V 3/15
USPC .............................................. 342/22, 27, 179
See application file for complete search history.

(56) References Cited

U.S. PATENT DOCUMENTS

| | | | |
|---|---|---|---|
| 5,384,715 A | 1/1995 | Lytton | |
| 5,499,029 A | 3/1996 | Bashforth et al. | |
| 6,462,696 B1* | 10/2002 | Gorman | 342/22 |
| 7,278,223 B1 | 10/2007 | Dever et al. | |
| 7,548,192 B1* | 6/2009 | Holt | 342/191 |
| 7,683,821 B1* | 3/2010 | Clodfelter | 342/22 |
| 8,531,329 B2* | 9/2013 | Mahler et al. | 342/22 |
| 8,686,891 B2* | 4/2014 | Krapf et al. | 342/22 |
| 2003/0112170 A1* | 6/2003 | Doerksen et al. | 342/22 |
| 2005/0097765 A1 | 5/2005 | Sorensen et al. | |
| 2006/0000100 A1 | 1/2006 | Melittas | |
| 2006/0164287 A1* | 7/2006 | Holt et al. | 342/22 |
| 2007/0090989 A1* | 4/2007 | Weil | 342/22 |
| 2007/0107241 A1 | 5/2007 | Sergeyeyenko | |
| 2007/0139249 A1* | 6/2007 | Baharav et al. | 342/22 |
| 2008/0291076 A1* | 11/2008 | Skultety-Betz et al. | 342/22 |

(Continued)

OTHER PUBLICATIONS

Traille, A.; Coustou, A.; Aubert, H.; Sangkil Kim; Tentzeris, M.M., "Monolithic paper-based & inkjet-printed technology for conformal stepped-FMCW GPR applications: First results," Microwave Conference (EuMC), 2013 European , vol., No., pp. 13,16, Oct. 6-10, 2013.*

*Primary Examiner* — John B Sotomayor
(74) *Attorney, Agent, or Firm* — Michael J. Feigin, Esq.; Feigin & Associates, LLC

(57) ABSTRACT

The disclosed technology includes a device and method of use for direct printing and ink or other marking, in conjunction with GPR techniques. In a most basic embodiment of the disclosed technology, a relevant date, time, filename, and other parameters are printed or otherwise physically exhibited on the measurement surface, so that RADAR files can be later attributed to a specific data collection site. In a more advanced embodiment of the disclosed technology, actual RADAR target information is printed, or otherwise physically exhibited, on the measurement surface, such as while measuring, or substantially while measuring, the surface and substrate beneath with GPR.

20 Claims, 6 Drawing Sheets

(56) References Cited

U.S. PATENT DOCUMENTS

| | | | |
|---|---|---|---|
| 2010/0045517 A1* | 2/2010 | Tucker et al. | 342/357.08 |
| 2010/0052971 A1* | 3/2010 | Amarillas | 342/22 |
| 2010/0117885 A1* | 5/2010 | Holbrook et al. | 342/22 |
| 2010/0265117 A1* | 10/2010 | Weiss | 342/22 |
| 2011/0040176 A1* | 2/2011 | Razansky et al. | 600/425 |
| 2011/0169682 A1* | 7/2011 | Chen | 342/21 |
| 2011/0169683 A1* | 7/2011 | Otts | 342/22 |
| 2011/0196534 A1* | 8/2011 | Ekes et al. | 700/259 |
| 2012/0105267 A1* | 5/2012 | Delia et al. | 342/22 |
| 2012/0249356 A1* | 10/2012 | Shope | 342/22 |
| 2012/0256777 A1* | 10/2012 | Smith et al. | 342/22 |
| 2013/0207830 A1* | 8/2013 | Watts et al. | 342/22 |
| 2014/0104094 A1* | 4/2014 | Feigin | 342/22 |

* cited by examiner

HAND-HELD RADAR DEVICE WITH DIRECT PRINTING BASED ON RADAR INPUT

FIELD OF THE DISCLOSED TECHNOLOGY

The disclosed technology relates generally to ground-penetrating radar (GPR), and, more specifically, to a technique for displaying GPR data.

BACKGROUND OF THE DISCLOSED TECHNOLOGY

GPR, or ground-penetrating RADAR (where RADAR is "RAdio Detection and Ranging"), is a technology used to assess the composition and location of heterogeneous materials. GPR uses common radio frequencies and is particularly useful in that it is both non-destructive and non-ionizing. In fact, GPR uses frequencies similar to those of a cellular phone, but at far lower power levels. Common applications include locating the precise position of rebar (short for "reinforcing bar") within a concrete wall/floor, identifying and locating buried objects underground, assessing the quality and uniformity of an asphalt or concrete highway surface, and detecting deterioration on bridge decks. In road surface applications, GPR is used, for example, to detect cracks, fissures, or contamination in any one of the chip seal, pavement layers, gravel base, and so forth. In many roadway applications, a resolution of features of the road surface of less than one inch (2.54 cm) is desired. Such systems may be mounted on vehicles, traveling over the surface while acquiring measurement data. GPR systems are disclosed in more detail in U.S. Pat. No. 5,499,029 to Bashforth, et al., and U.S. Pat. No. 5,384,715 to Lytton, which are hereby incorporated by reference.

For concrete measurements, GPR is used to locate metallic and non-metallic targets, as well as detect changes in the material properties and voids. Common surfaces include the walls, floors, ceilings, columns, and other support structures of buildings, parking garages, and bridges. Applications include mapping deterioration, water-ingress, verifying proper placement of reinforcements and tensioning cables, measuring slab thickness, and identifying areas in which the material can be safely drilled, cored, or cut.

Hand-held devices containing transducers are used to collect RADAR information. Current GPR imaging techniques produce data that are either 1) displayed as a screen image on the device, either in real-time or post processed, 2) recorded in electronic format for later playback processing, and interpretation, or 3) printed in real-time on some form of paper. In an example of the state of the art, one might attempt to find rebar (short for "reinforcing bar"), conduit, and post-tensioning cables in a concrete building before drilling into the building to carry out repairs or upgrades. In order to do so, one using GPR might pass a RADAR transducer over the surface and record the received response. Locations of targets may be directly interpreted and marked (using chalk or other marking device) at this point, or the information may post-processed for more sophisticated analysis. In either case, it is critical that the user is able to precisely register the location of the RADAR data with the recorded measurement file.

If concurrent or post-processing is performed, one creates a map of the measured surface, either on a computer and/or on a blueprint, with detected positions of buried targets. Then, using this map, one returns to the physical surface and pinpoints where the targets are found, and manually places chalk marks at the position of the rebar. Then, one cuts into the concrete or other surface at places away from the targets. Inaccuracy in this process could lead to accidental damage of critical structural elements within the concrete. For example, the destruction of a post-tensioning cable caused by drilling location that was improperly assessed, could render a parking garage structurally unsafe.

It is a further safety and ergonomic issue that the user(s) must simultaneously position the RADAR transducer while making accurate positioning marks on the measurement surface. In the case of walls and ceilings, this is clearly a two-handed or two-person operation. Two handed operation is generally unsafe while standing on a ladder.

While the above methodology currently used in the art works, it has obvious drawbacks. Such methods can be dangerous, time-consuming, which translates into extra costs of hiring personnel; more problematic, they can be inaccurate. The prior art relies largely on not only user interpretation of data, but user creation or manipulation of position-registered data. The greatest room for error is in manually drawing chalk marks on the physical structure. Any error in recording the location of the measurements or drawing the markings on the structure before drilling may have catastrophic consequences for the project. While careful planning, measurement, drawing, and execution of the above method prevents error, as noted above, safe techniques are time consuming and expensive.

An improvement in the prior art of GPR measurements is needed, in order to reduce hazards, expense, and time taken to analyze and/or prepare a surface for drilling, while increasing accuracy of the process.

SUMMARY OF THE DISCLOSED TECHNOLOGY

Therefore, it is an object of the disclosed technology to provide lower cost tools which more reliably and accurately mark a surface measured with GPR.

It is a further object of the disclosed technology to provide an integrated radar device and printer.

It is yet a further object of the disclosed technology to mark a surface simultaneously. or substantially simultaneously. to the measuring of it, with such markings based on the measurements.

In an embodiment of the disclosed technology, a RADAR transmission and marking device has a bottom side and a top side opposite the bottom side, a radar antenna operative from the bottom side, a processor, a distance measurement tool, and a printing mechanism operative from the bottom side. (In the claim language, a recitation of a plain "device" without any modifier refers to the RADAR transmissions and marking device.) The printing mechanism is configured to print indicia on a surface in contact with the bottom side of the device, as a function of a received response to the radar antenna. "As a function of" is defined as "resulting from the output of, either directly or through one or more steps in-between." Thus, when the print mechanism prints as a function of the radar output, the printing is based on the radar measurement, such as the intensity at a point, and may include intermediate steps, such as user input to confirm printing at a specific point. "Operative from" is defined as a side of a device from which a majority or the entirety of the transmitted signal or ink emanates. A "bottom side" refers to a generally flat (within an acceptable tolerance level known in the art) side with wheels or adapted to be adjacent to a surface to be measured.

The device may be adapted to roll (on wheels, moving at an automated speed or pushed) or simply be pushed across the surface while a radio frequency signal is transmitted and received by the radar antenna. This may be at the same time, or a different time, as the printing mechanism makes indicia on the surface.

The printing of indicia on the surface may be as a result of target detection at a specific location. That is, the printing is carried out on a surface where a target is detected there-under. Upon detection of a target, the printing mechanism makes the indicia, in embodiments of the disclosed technology, calibrated such that the velocity of movement of the device, processing time (time taken for the processor to process data and/or time for the print head to cause indicia to be printed), and position of the printing mechanism relative to the antenna causes the indicia to be printed on a location associated with the target. A "location associated with the target" refers to the surface above the target in-line with the center of measurement of the antenna and target itself.

In one embodiment, before printing the indicia, a user is prompted to accept the target. The indicia are then printed only after receiving input from the user, accepting the target.

A screen on a side other than the bottom side (such as the top side), exhibiting a visual representation of the received response of the radar antenna, may be employed. Upon receipt of an input from a user, a determination of a point on the surface associated with a part of the visual representation (such as the center point of the visual representation) of the received response on the display is made. The print mechanism is then instructed to make an indicium on the surface at this point, either as soon as the print head passes there-over, or as part of a second pass at a later time.

The print mechanism, in embodiments of the disclosed technology, is an ink-jet print head.

In a method of embodiments of the disclosed technology, a surface is marked based on RADAR measurements. This is effectuated through steps of rolling or pushing a combination radio frequency transmitter and printing mechanism device from a start point to an end point, transmitting radar signals by way of the transmitter into a substrate beneath a surface, making a determination of at least one target in the substrate beneath a point of the surface, and printing, using the printing mechanism, a mark at the point on the surface. When "or" is used, it should be interpreted as being "inclusive." Thus, "a or b" should be interpreted as any one of "a," "b," and "a and b."

The above described step of "making a determination of a target" is made automatically, using migration, in embodiments of the disclosed technology. After the step of making a determination and before said step of printing, further steps may be carried out (in a semi-automated mode), in order of a) prompting a user if a marking should be made on the target, and b) receiving an input from the user indicating that a marking should be made on the target.

The radio frequency transmitter and the printing mechanism may be spaced apart, such that when the radio frequency transmitter is over a point with a determined target being beneath, the printing mechanism is at a second point on the surface. A "point on the surface" is defined as "where a device will operate when operating properly." That is, when a transmitter or print head is at or on a point of the surface, this is the central point on which it will transmit radio frequency signals, within an acceptable tolerance level determined by the user or manufacturer of the device, such as within one centimeter. Further, a step of waiting until the printing mechanism passes over the point with the target being beneath, may be carried out until or before carrying out the step of printing.

In another embodiment, a device has a handle on a top side, a display on a top side, at least one button adapted to convert mechanical pressure into electrical impulses, a print head aimed such that ink exiting from the print head exits past a bottom side of the device, opposite the top side, and a radar transmitter aimed such that radar is transmitted, at least, mostly in a direction away from the top side (such as, into a surface to be measured). Such a device may have any one of, or a multiple of, an automatic, semi-automatic, or manual measurement and marking mode, of a surface adjacent to the button side of the device. The definitions for each of these modes may be found in the "Detailed Description" below.

DETAILED DESCRIPTION OF EMBODIMENTS OF THE DISCLOSED TECHNOLOGY

The disclosed technology includes a device and method of use for direct (defined as "on the surface of the measured substrate of a surface") printing and ink or other marking, in conjunction with GPR techniques. In a most basic embodiment of the disclosed technology, a relevant date, time, file name, and other parameters are printed or otherwise physically exhibited on the measurement surface, so that RADAR files can later be attributed to a specific data collection site. In a more advanced embodiment of the disclosed technology, actual RADAR target information is printed, or otherwise physically exhibited, on the measurement surface, such as while measuring, or substantially (defined as, in the same pass or movement of the device from a start point to end point without removing it from touching the surface) while measuring the surface and substrate beneath with GPR.

The direct on-surface RADAR printing of embodiments of the disclosed technology allows a user to automatically, semi-automatically, or manually print target information that is automatically aligned with the position of the RADAR transducer. All three operational modes utilize the device's navigation system, which is, in embodiments, a survey wheel encoder, to ensure that the ink marks are aligned with the target locations. Alignment is a critical element because the location of the printer may be offset some distance from that of the transducer antennas.

"Automatic printing" is defined as being pre-programmed or pre-configured to estimate the location and depth of RADAR target information and driving or operating the printer as a function of the RADAR target information. Either graphical or text information is printed on the measurement surface, whose ink density or displayed semaphores convey information regarding the estimated locations and depths of objects (or lack of objects) in the substrate (defined as any distance under the measurement surface) which detects objects buried within the surface. "Semi-automatic printing"

is defined as being pre-programmed or pre-configured to estimate the location and depth of RADAR target information and driving or operating the printer as a function of the RADAR target information, subject to a prompt to a user of the RADAR measuring and printing device to accept a target estimate before the location of that feature is printed on the surface. "Manual printing" is defined as exhibiting RADAR measurements on a display of the RADAR measuring and printing device and printing on the measured surface a marking corresponding to a location shown at a designated point, such as the center, of the display device.

Embodiments of the disclosed technology will become clearer, in view of the following description of the figures.

Figure 1:
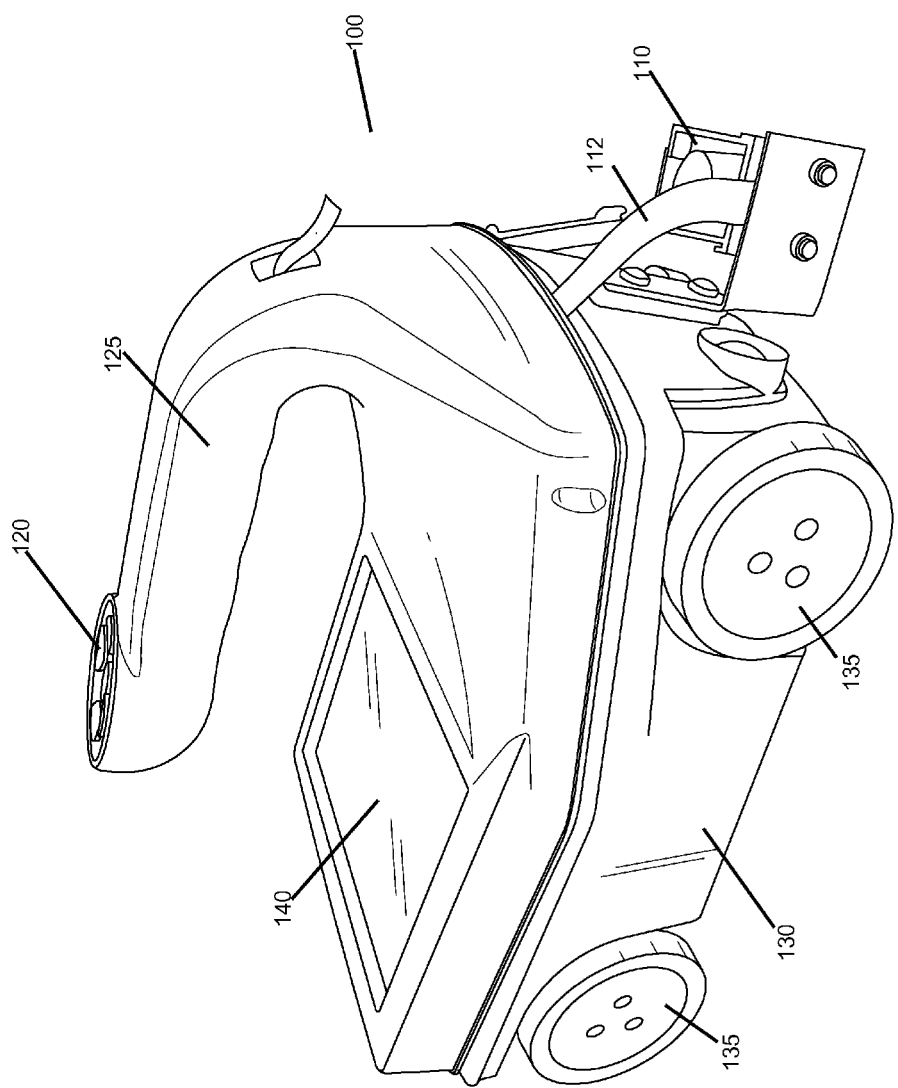
FIG. 1 shows a perspective view of a GPR measurement device and printer of an embodiment of the disclosed technology.
Figure 5:
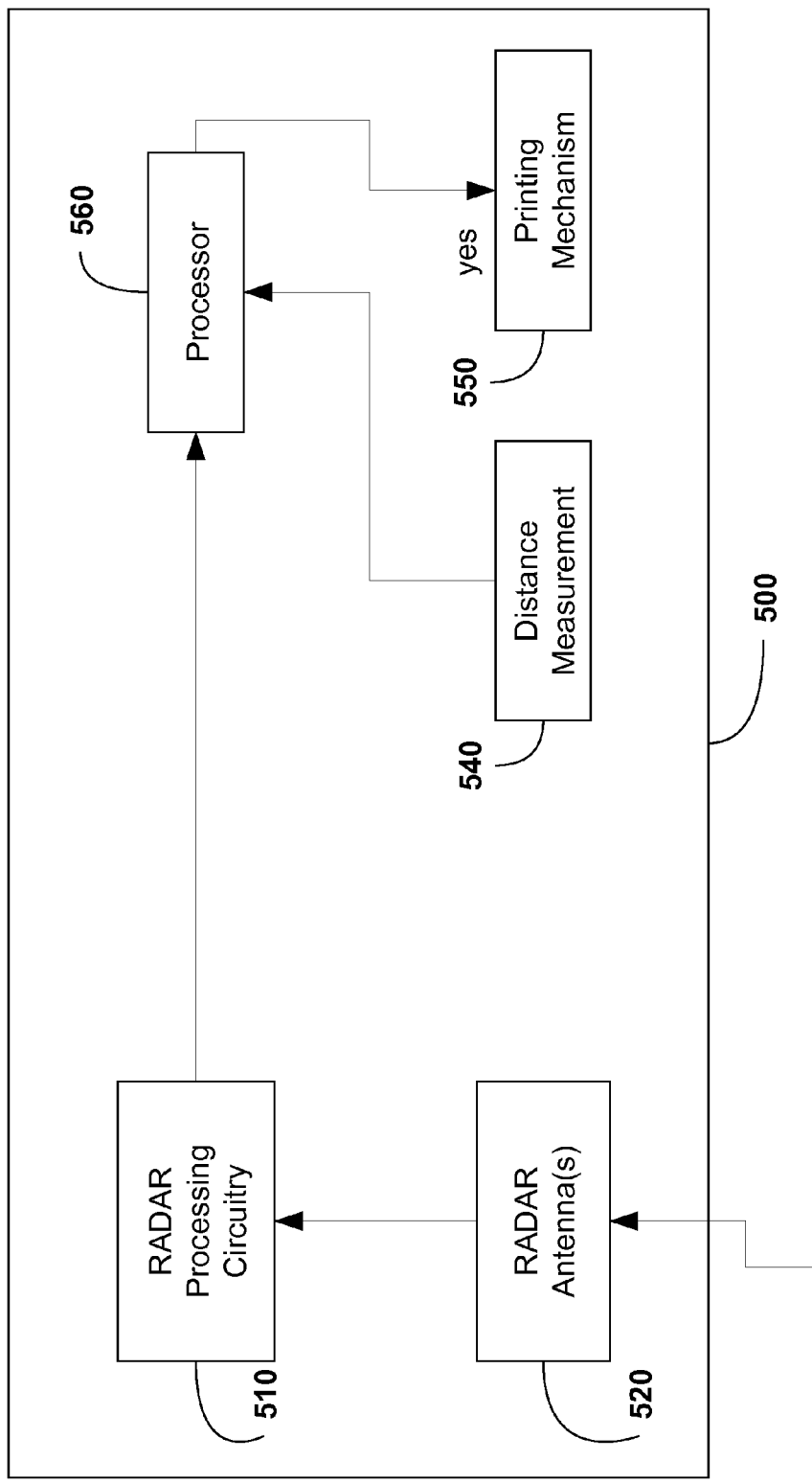
FIG. 5 shows a high level block diagram of devices used to carry out embodiments of the disclosed technology.
Figure 6:
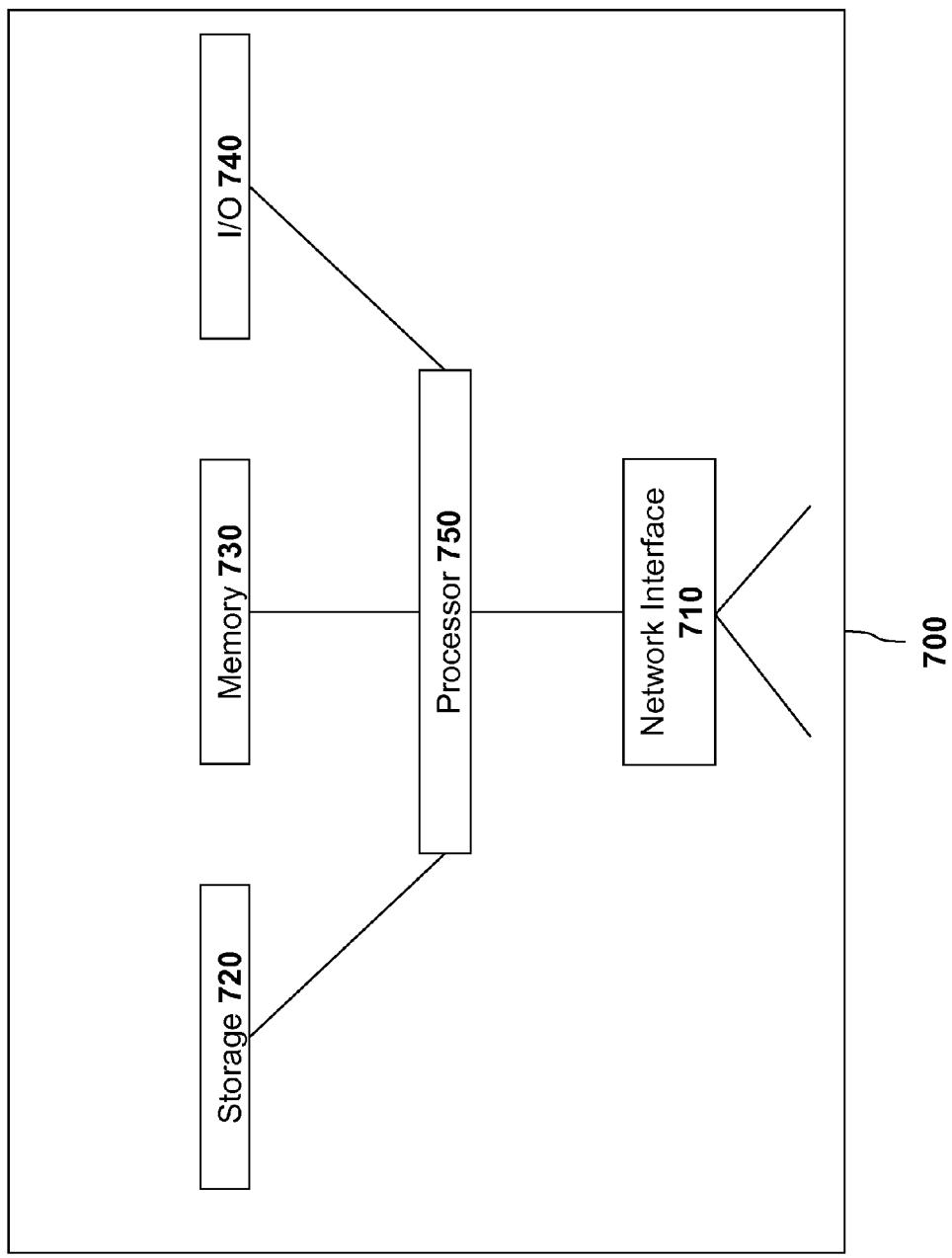
FIG. 6 shows a high-level block diagram of an electrical component's device which may be used to carry out the disclosed technology.

FIG. 1 shows a perspective view of a GPR measurement device and printer of an embodiment of the disclosed technology. The device is shown as an example of a combination RADAR measuring and printing device. A user operates the device. A user is defined as a person or equivalent thereof operating the device (physically supporting, controlling the position of, or instructing the device to transmit RADAR measurements and/or print on a surface). The device 100 shown has a plurality of wheels 135, such as four wheels, used to roll the device over a surface during operation thereof. In embodiments, the rolling is over subsequent linear paths, so any path of motion and repetition thereof may be employed. The device has both a display 140, such as a liquid crystal display (LCD), plasma display, cathode ray tube (CRT) or other display configured to output data received via an antenna transmitting and receiving RADAR data. The base 130 of the device is attached to the wheels 135, a print head 110 and transmitter. A cable 112 attaches the print head 110 to processing equipment, such as microprocessors and memory, held in the device. FIGS. 5 and 6, discussed below, each show a high-level view of the electronics used in embodiments of the disclosed technology.

Figure 4:
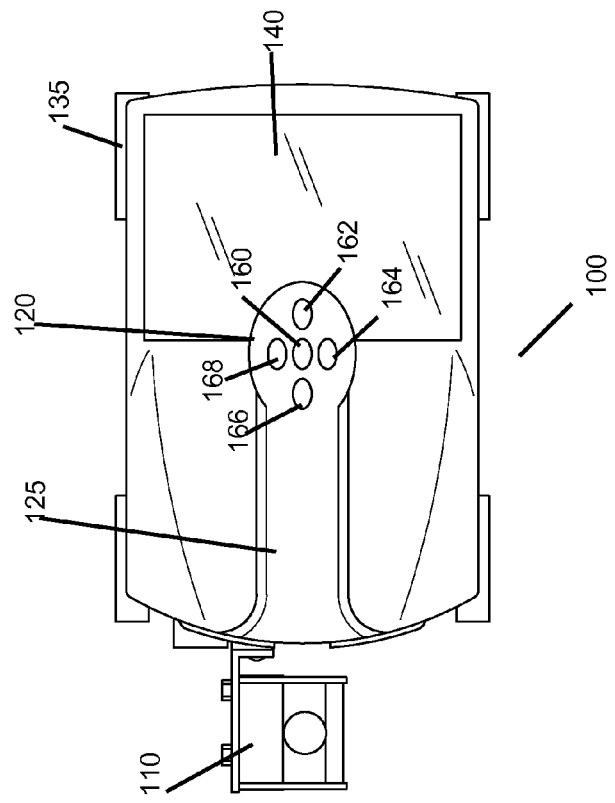
FIG. 4 shows top and bottom plan views of the GPR measurement device and printer of FIG. 1, in an embodiment of the disclosed technology.
Figure 4:
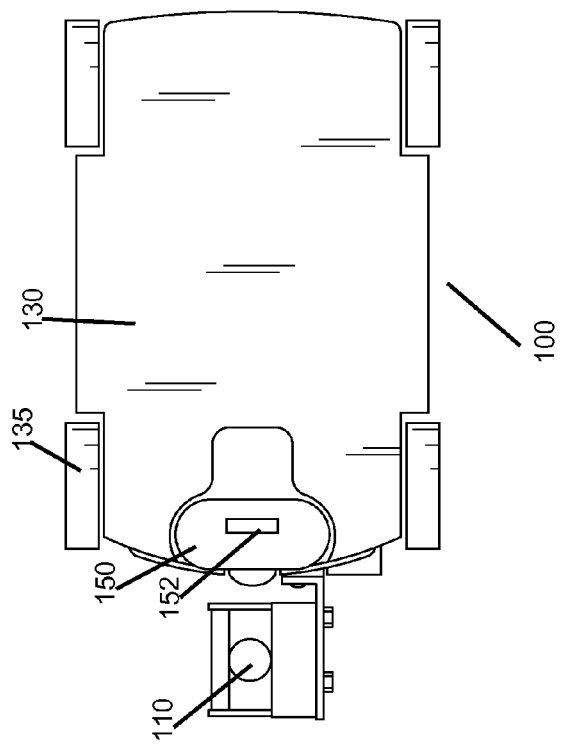

Skipping now to FIG. 4, while discussing FIGS. 1 and 4 concurrently, FIG. 4 shows top and bottom plan views of the GPR measurement device and printer of FIG. 1, in an embodiment of the disclosed technology. The transmitter is positioned on the opposite side of the device as the display 140, in embodiments of the disclosed technology, as shown in element 150/152 of FIG. 4. A handle 125 is designed to allow a user to grasp the device to steady it during operation, such as while the wheels 135 are automatically operated (rotating by way of motorized operation at the command of a processor), or manually operated by pushing the device by way of the handle 125. Buttons at the extreme end of the handle 120 are used to control operation of the device, such as the data being displayed on the display 140, movement of the device, instructions concerning printing of a marking, and mode of operation (such as automatic, semi-automatic, or manual).

Referring now to the buttons on the extreme end of the handle 120, these buttons may include four directional buttons 162, 164, 166, and 168 positioned in the direction of movement for menus/selections displayed on the display and/or of the device itself. A middle button 160, by way of example, may be configured to stop and start the RADAR transmissions, movement of the device, and/or instruct the device, by way of a processor, to make a marking on the surface using the print head 110.

In the embodiment shown, the print head 110 is not aligned with the RADAR transmitter/antenna 152 or RADAR housing 150. In other embodiments, the antenna 152 is aligned with the print head 110; however, even when doing so, given the motion of the device over a surface during measuring and printing, and the time it takes to execute a command between the measuring and printing, it is necessary, in embodiments, to calibrate the measurements displayed on the screen 140 with the printing by the print head 110. Thus, for example, display at the horizontal and vertical center of the screen 140 is calibrated to correspond to both the center of the outputted RADAR measurement and the physical location on the surface where a marking is placed, when made on the surface. This will be conceptually explained further with the following description of FIG. 3.

Figure 2:
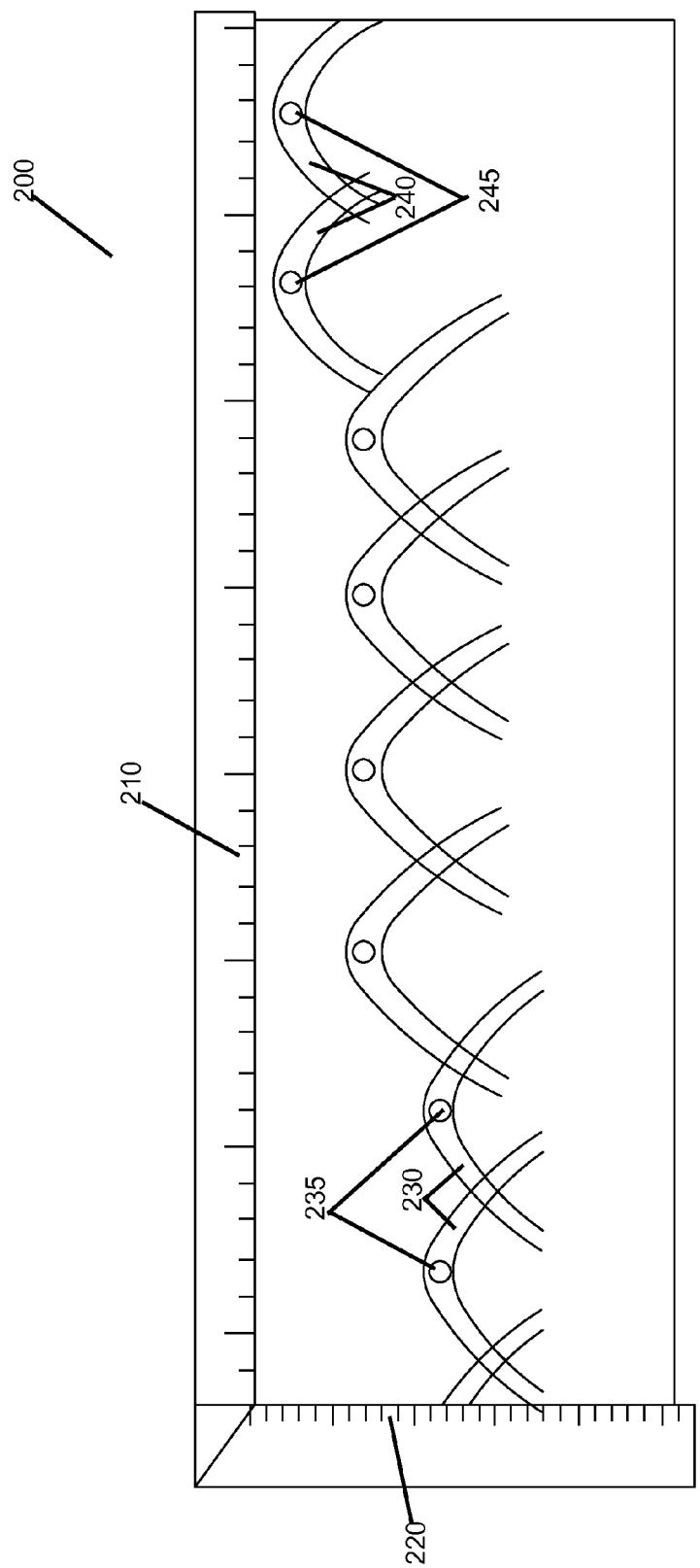
FIG. 2 shows an example of GPR data output which is displayed on a display of the GPR measurement device and printer of FIG. 1, in an embodiment of the disclosed technology.

FIG. 2 shows an example of GPR data output which is displayed on a display of the GPR measurement device and printer of FIG. 1, in an embodiment of the disclosed technology. The output 200 has an X-axis 210 and Y-axis 220. The RADAR output depicted in this line-art equivalent drawing is outputted, in whole or in part, on the display 140 (though it need not be in an automatic or semi-automatic mode of operation). The X-axis is a function of distance, while the Y-axis is a function of received response of the transmitted radio signal into a substrate. The approximate centers 235 and 245 of the respective overlapping accent-shaped peaks 230 and 240 are representative of a position of, for example, rebar within a concrete wall and the relative depths thereof. In automatic or semi-automatic modes of operation, the position of metal or other harder substances within a substrate may be determined based on finding the peaks of energy responses, such as shown in FIG. 2. In automatic mode, the printer is instructed to draw on the surface of the substrate (for example, a wall or surface of asphalt) at the point of the peak, such as points 235 and 245, and there-around, such as with an "X," "O," crosshair, or other mark. The marking on the surface of the substrate may also be continuous and reflect the intensity of the received response at the particular position.

Figure 3:
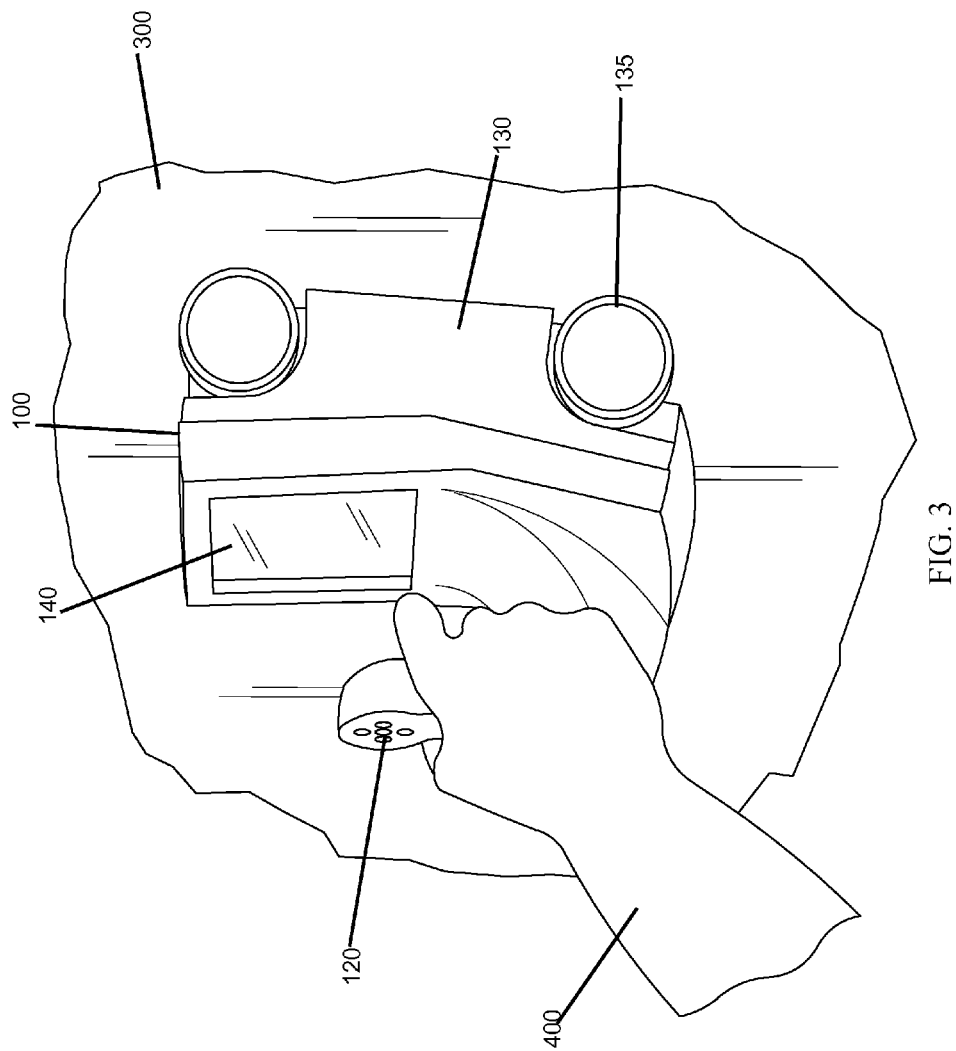
FIG. 3 shows the GPR measurement device and printer of FIG. 1 in use, in an embodiment of the disclosed technology.

FIG. 3 shows the GPR measurement device and printer of FIG. 1 in use, in an embodiment of the disclosed technology. Here, the RADAR and printer combination device 100 has its bottom side (the side adjacent to the base, opposite the top side with the display 140) and wheels 135 against a wall 300. A user, using his arm 400, moves the device up (or down or across) the wall in a straight path. As radio frequency signals are transmitted into the wall (or any other surface to be measured), the received reflected response is exhibited on the display 140, in embodiments of the disclosed technology. The device 100 rolls along the surface, exhibiting the received radio frequency response. Describing now the manual mode of operation, the user views an image on the display screen 140, produced based on a received radar response being transmitted by transmitter 152 (see FIG. 4). When it is desired to physically mark a spot, such as by way of printing with an inkjet print head 110, the user presses a button on the end of the handle 120 (of course, the button may be anywhere and the input method may be of any type known in the art). In this example, the spot to be marked corresponds to the position of the image shown in the horizontal and vertical center of the display 140. For purposes of this example, this point will be referred to as "Point X." Then, based on the calibration of the device, speed of movement, and pre-determined discovered time it takes, within an acceptable margin of error determined by the mechanics and electronics of the device, as the print head moves over Point X, the processor instructs the print head to make the marking on Point X.

In the automatic mode of operation, a difference between what is described in the preceding paragraph and the automatic mode is that the instruction for the print head to make a marking on Point X, and the position of Point X itself, is determined based on target detection—the determination of the intensity of the received response for a particular position. Point X, and other similar points, are made where the intensity, defined as a minimum electrical response per unit area, is above a threshold. After moving over a distance, generally, a pattern of ink markings will develop based on the pattern of rebar used to construct the building being marked. In automatic mode, no display, such as on the display 140, of the received radar response is required. That is, a user may simply pass the device over a surface, and markings are made where deemed appropriate.

In semi-automatic mode of operation, the intensity of the points is determined; however, an extra step is carried out, whereby the user is prompted at each point, or at least one point, as to whether or not to draw at each detected point. This method may be used, for example, when the accuracy of points to draw results in some false positives when using automatic mode, and the user wishes to draw points only one type of received response (e.g., waveform shown reflects position of rebar), but not others (e.g., waveform shown reflects position of wood within the concrete).

In embodiments of the disclosed technology, target detection is carried out by way of migration. Migration is defined as a procedure that is used to transform surface-recorded GPR data into data in which the subsurface heterogeneities are located at the correct depth and displayed in the most compact form, such as shown in FIG. 2. Target detection is further a method of discerning between relevant information-bearing patterns (called targets) and patterns that distract from that information (either random, called noise, or constant or varying background, called clutter).

To denote a target present as a hypothesis H1, a target not present as H0 and a pattern as X, one can use Bayes formula to get:

$$P(H_i \mid X) = \frac{P(X \mid H_i)P(H_i)}{P(X)}, i = 0, 1$$

The probability of the pattern P(X) will act as a normalizing constant and will usually not affect the decision-making process. The probability of the existence of a target $P(H_i)$ reflects prior knowledge as for the existence of the target, and the conditional probability $P(X|H_i)$ is the prior knowledge on how an existence (or the absence) of a target affects the measured pattern. By setting decision boundaries, one determines the probability of detection and the probability of false alarm—which sets the false alarm rate of the system. Either a linear of non-linear algorithm is applied, with the goal of best satisfying Bayes formula.

Migration is the process of converting radar image to that of inferred target locations based upon known or estimated electrical characteristics of the material. This is a deconvolution process which "focuses" the displayed RADAR image, such that the influence of limited wave propagation velocity, dispersion, and other phenomena, are removed from the displayed result. It is then possible to threshold and/or map this information to printed characters and symbols, such that a useful depictive result is displayed on the material surface. Migration is not necessarily a requirement for printing, but is a helpful tool that improves the quality of the result in embodiments of the disclosed technology.

FIG. 5 shows a high level block diagram of devices used to carry out embodiments of the disclosed technology. The RADAR antenna or antennas 520 receive a response to transmitted radio wave pulses. Radar processing circuitry 510 interprets the response through migration or other techniques and passes the data to a processor 460. The processor 560 further receives data about distance (defined as a distance from start-point in the X and/or Y direction or from an otherwise defined position) from a distance measuring tool or mechanism 540. Distance measuring tools used may include any one of, or a combination of, a flywheel with start-point as input, dead reckoning, camera, global positioning system, N-wave laser guided positioning, laser distance measuring equipment, tape measures and manual input of position at regular intervals with interpolation of intermediate points, or other measurement methods and systems known in the art. Based on receipt of the distance measurement, and determination of a location of the RADAR antenna(s) 520 and a printing mechanism 550, by the processor 560, the printing mechanism 550 is instructed to make a marking. The marking is made corresponding to, and as a direct result of, the received response from the antenna 520 and RADAR processing circuitry 510, and may reflect any of the intensity of the RADAR output at a point where the marking is made, or difference in intensity at a point where a marking is made, compared to surrounding points where the device 500 passes over without making a mark. The processor 560 may also receive an input (shown in FIG. 6) indicating where a marking should be made, and send instructions to the printing mechanism 550, accordingly. The printing mechanism 550 may be any one of, or a combination of, an inkjet printer or print head, laser printer or print head, dot matrix or other type of impact print head, where impact on a tape of ink makes a marking, marker (such as a turtle-type marking device, as known in the prior art), or the like.

FIG. 6 shows a high-level block diagram of an electrical components device which may be used to carry out the disclosed technology. Measurement device 700 comprises a processor 750 that controls the overall operation of the computer by executing the measurement device's program instructions which define such operation. The measurement device's program instructions may be stored in a storage device 720 (e.g., magnetic disk, flash disk, database) and loaded into memory 730 when execution of the measurement device's program instructions is desired. Thus, the measurement device's operation will be defined by the measurement device's program instructions stored in memory 730 and/or storage 720, and the measurement device will be controlled by processor 750 executing the measurement device's program instructions. A measurement device 700 also includes one or a plurality of input network interfaces for communicating with other devices via a network (e.g., the internet). A measurement device 700 also includes one or more output network interfaces 710 for communicating with other devices. Measurement device 700 also includes input/output 740 representing devices which allow for user interaction with the computer 700 (e.g., display, keyboard, mouse, speakers, buttons, etc.). One skilled in the art will recognize that an implementation of an actual measurement device will contain other components as well, and that FIG. 6 is a high level representation of some of the components of such a measurement device for illustrative purposes. It should also be understood by one skilled in the art that the method and devices depicted in FIGS. 1 through 5 may be implemented on a device such as is shown in FIG. 6.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

I claim:

1. A RADAR transmission and marking device, comprising:
   a bottom side and a top side opposite said bottom side;
   a radar antenna operative from said bottom side transmitting radar signals into a substrate beneath a surface;
   a processor;
   a distance measurement tool attached to said RADAR transmission and marking device measuring a distance traveled for said RADAR transmission and marking device from a starting point to a second point; and
   a printing mechanism operative from said bottom side;
   wherein said printing mechanism prints indicia on a surface in contact with said bottom side of said device at the same time as said transmission and marking device is moving and as a function of a received response of said radar antenna such that said printing mechanism is instructed to print in a manner that said indicia on said surface matches a location, determined by way of said distance measurement tool and said radar antenna of said received response.

2. The device of claim 1, wherein said device is rolled or pushed across said surface while a radio frequency signal is transmitted and received by said radar antenna, and said printing mechanism makes indicia on said surface.

3. The device of claim 1, wherein said printing mechanism prints indicia based on target detection at a specific location due to said received response of said antenna being above a minimum electrical response per unit area, causing said printing mechanism to automatically print indicia as said printing mechanism passes over said target, and
   wherein a velocity of movement of said RADAR transmission and marking device remains constant during said target detection and said printing.

4. The device of claim 3, wherein said printing mechanism is calibrated such that the velocity of movement of said device, processing time, and position of said printing mechanism relative to said antenna cause said indicia to be printed on a location where said target is detected.

5. The device of claim 4, wherein said processor, before sending instructions for printing said indicia, causes a user to be prompted to accept said target, and said indicia are printed only after receiving input from said user to accept said target.

6. The device of claim 1, further comprising a screen on a side other than said bottom side, exhibiting a visual representation of said received response of said radar antenna.

7. The device of claim 6, wherein upon receipt of input from a user:
   a determination of a point on said surface associated with a part of said visual representation of said received response on said display is stored on a storage device; and
   said print mechanism is instructed to make an indicium on said surface at said point.

8. The device of claim 7, further comprising wheels on said device which move said device from a first position on said surface to a second position on said surface after receiving said input from said user and before said print mechanism is instructed to make an indicium, said distance between said first and second position based, at least in part, on a distance between said antenna and said print head.

9. A method of using the device of claim 2, wherein said radio frequency sending and receiving by said antenna is carried out in a first pass over said surface, and said indicia are placed on said surface in a second pass over said surface, said antenna being non-operative in said second pass, and said printing mechanism being non-operative in said first pass.

10. A method of marking a surface, based on RADAR measurements, comprising the steps of:
    rolling or pushing a combination radio frequency transmitter and printing mechanism device from a start point to an end point;
    transmitting radar signals by way of said transmitter into a substrate beneath a surface;
    making a determination of at least one target in said substrate beneath a point of said surface;
    measuring a distance of movement from said one target that said device continues to move using one of a flywheel, dead reckoning, camera, global position system, laser distance measuring equipment or equivalent thereof;
    printing, using said printing mechanism, a mark at said point on said surface while said combination radio frequency transmitter and printing mechanism device is moving from said start point to said end point and said printing mechanism prints while passing over said location on said surface calibrated based on print speed of said printing mechanism and said measuring of distance from said target.

11. The method of claim 10, wherein said step of making a determination of a target is made automatically, using migration.

12. The method of claim 11, wherein, after said step of making a determination and before said step of printing, further steps are carried out, in order, of:
    prompting a user if a marking should be made on said target;
    receiving an input from said user indicating that a marking should be made on said target.

13. The method of claim 10, wherein said printing mechanism is an inkjet print head.

14. The method of claim 10, wherein:
    said radio frequency transmitter and said printing mechanism are spaced apart, such that when said radio frequency transmitter measures said point with said target being beneath, said printing mechanism is at a second point on said surface, separate from said measured point; and
    said printing mechanism moves, due to said rolling or pushing, to said point with said target said target is marked.

15. The method of claim 14, further comprising a step of waiting until said printing mechanism passes over said measured point, with said target being underneath, until carrying said further step of printing.

16. A device comprising:
    a handle on a top side;
    a display on a top side;
    at least one button adapted to convert mechanical pressure into electrical impulses;
    a print head aimed such that ink exiting from said print head exits past a bottom side of said device, opposite said top side;
    a radar transmitter aimed such that radar is transmitted, at least, mostly in a direction away from said top side;
    wherein while said device is moved over a surface, based on a response to said transmitted said radar, a processor instructs said print head to print at a location of said response simultaneous to continued said transmitted said radar.

17. The device of claim 16, comprising an automatic measurement and marking mode of a surface adjacent to said button side of said device.

18. The device of claim 16, comprising a semi-automatic measurement and marking mode of a surface adjacent to said button side of said device.

19. The device of claim 16, comprising a manual measurement and marking mode of a surface adjacent to said button side of said device.

20. The device of claim 16, wherein said distance measurement tool is a a survey wheel encoder, and said indicia printed as a function of a received response to said radar antenna is printed at said location based on output of said survey wheel encoder.

\* \* \* \* \*